No. 713,769. Patented Nov. 18, 1902.
E. KEMPSHALL.
GOLF BALL.
(Application filed June 14, 1902.)
(No Model.)

Witnesses:
C. W. Pratt.
Herbert J. Smith

Inventor:
Eleazer Kempshall.
By his Attorney
F. H. Richards.

UNITED STATES PATENT OFFICE.

ELEAZER KEMPSHALL, OF BOSTON, MASSACHUSETTS.

GOLF-BALL.

SPECIFICATION forming part of Letters Patent No. 713,769, dated November 18, 1902.

Application filed June 14, 1902. Serial No. 111,764. (No model.)

*To all whom it may concern:*

Be it known that I, ELEAZER KEMPSHALL, a citizen of the United States, residing in Boston, in the county of Suffolk and State of Massachusetts, have invented certain new and useful Improvements in Golf-Balls, of which the following is a specification.

This invention relates to golf-balls; and its object is to improve the flying power and durability thereof.

Figure 1:
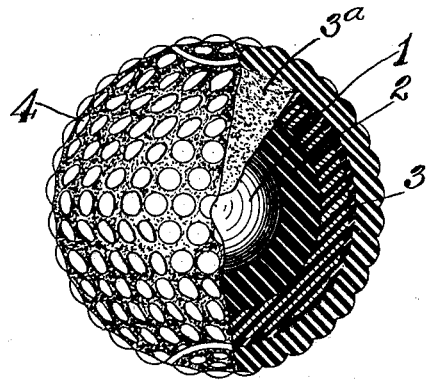
Figure 2:
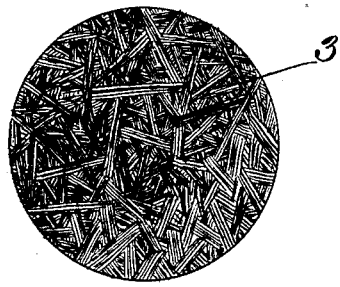

In the drawings forming a part of this specification, Figure 1 is a part-sectional view of a golf-ball made in accordance with my improvements, and Fig. 2 is a view of a filling before the shell or cover of the ball is placed thereon.

In the views similar parts are designated by similar characters of reference.

I preferably employ a center piece 1, of gutta-percha, upon which is distended a sphere 2, of solid soft rubber. Upon said sphere I wind rubber thread under tension in miscellaneous directions to form a materially-larger sphere 3, Fig. 2, and upon the latter I form a shell 4, of gutta-percha, by means of heat and compression, the compression being maintained until the shell cools and hardens, so that said shell holds the filling under compression.

At the operation of completing the shell 4 I carry the heating to such an extent as to vulcanize the outer windings of the filling 3 and cause them to form a continuous sheet, as at 3ª, Fig. 1, said sheet being also vulcanized or welded to the gutta-percha shell 4, as well as to the windings of rubber thread immediately underlying said sheet. It will be seen that by this means the shell 4 is intimately united to the filling or body 3, which is an important feature in a golf-ball, and, further, that the rubber sheet 3ª is a protection for the rubber threads therewithin, since it tends to prevent the danger of a sharp blow cutting said threads, and thereby causing the ball to burst by reason of the expansive pressure of the released threads.

The threads used in forming at least the outer portion of the windings in the filling 3 are preferably of a mixture of rubber suitable for vulcanizing, and, if desired, they may be vulcanized in a mold, so as to form a smooth exterior for the filling before the shell 4 is placed thereon.

Having described my invention, I claim—

A playing-ball comprising a hard center piece, a sphere of solid soft rubber tensioned thereon, tensioned rubber threads wound upon said sphere and forming a materially-larger sphere; the outer threads in said larger sphere being vulcanized together and forming a substantially continuous sheet which incloses the inner threads; and a shell of gutta-percha; said rubber sheet being also vulcanized to said gutta-percha shell, and the latter holding said spheres under compression.

ELEAZER KEMPSHALL.

Witnesses:
B. C. STICKNEY,
FRED. J. DOLE.